United States Patent [19]

Orimo et al.

[11] Patent Number: 5,561,802
[45] Date of Patent: Oct. 1, 1996

[54] METHOD FOR MANAGING PROGRAMS WITH ATTRIBUTE INFORMATION AND DEVELOPING LOADED PROGRAMS

[75] Inventors: Masayuki Orimo, Kawasaki; Kinji Mori, Yokohama; Yasuo Suzuki, Ebina; Katsumi Kawano, Kawasaki; Minoru Koizumi, Yokohama; Kozo Nakai, Katsuta; Hirokazu Kasashima, Hitachi, all of Japan

[73] Assignee: Hitachi, Ltd., Tokyo, Japan

[21] Appl. No.: 351,166

[22] Filed: Nov. 30, 1994

Related U.S. Application Data

[63] Continuation of Ser. No. 942,129, Sep. 8, 1992, abandoned, which is a continuation of Ser. No. 283,911, Dec. 13, 1988, abandoned.

[30] Foreign Application Priority Data

Dec. 18, 1987 [JP] Japan ................................. 62-318822
Mar. 16, 1988 [JP] Japan ................................. 63-60371

[51] Int. Cl.⁶ ........................... G06F 11/16; G06F 15/177
[52] U.S. Cl. ................... 395/700; 395/650; 395/200.03; 364/DIG. 1; 364/280.2; 364/280.6; 364/281.6; 364/281.9; 364/285.3
[58] Field of Search ......................... 395/800, 375, 395/500, 200, 650, 700, 800, 200.03; 364/550

[56] References Cited

U.S. PATENT DOCUMENTS

| | | | |
|---|---|---|---|
| 4,130,865 | 12/1978 | Heart et al. | 364/200 |
| 4,307,447 | 12/1981 | Prouanzano et al. | 364/200 |
| 4,500,960 | 2/1985 | Babecki et al. | 364/200 |
| 4,558,413 | 12/1985 | Schmidt et al. | |
| 4,577,272 | 3/1986 | Ballew et al. | 364/200 |
| 4,648,064 | 3/1987 | Morley | 364/900 |
| 4,694,396 | 9/1987 | Weisshaar et al. | 364/200 |
| 4,714,992 | 12/1987 | Gladney et al. | 364/200 |
| 4,719,622 | 1/1988 | Whipple et al. | 364/200 |
| 4,785,397 | 11/1988 | Koizumi et al. | 364/200 |
| 4,794,519 | 12/1988 | Koizumi et al. | 395/800 |
| 4,803,683 | 2/1989 | Mori et al. | 371/19 |
| 4,819,159 | 4/1989 | Shipley et al. | 364/200 |
| 4,841,433 | 6/1989 | Hakim et al. | 364/200 |
| 4,864,497 | 9/1989 | Lowry et al. | 364/200 |
| 4,868,733 | 9/1989 | Fujisawa et al. | 364/200 |
| 4,918,596 | 4/1990 | Nakano | 364/200 |
| 4,937,784 | 6/1990 | Masai et al. | 364/900 |
| 4,953,096 | 8/1990 | Wachi et al. | 364/550 |
| 5,146,559 | 9/1992 | Orimo et al. | 395/200 |
| 5,291,591 | 3/1994 | Kawano et al. | 395/600 |
| 5,313,632 | 5/1994 | Sekizawa et al. | 395/650 |
| 5,416,905 | 5/1995 | Mori et al. | 395/200.3 |

*Primary Examiner*—Larry D. Donaghue
*Attorney, Agent, or Firm*—Antonelli, Terry, Stout & Kraus

[57] ABSTRACT

Attribute information of programs developed by processors in a distributed processing system include I/O data for defining I/O operation of the programs, which is given in a program description form. A correlation of the programs is checked based on the content of the attribute information. Program generation information, program content information and program modification information are added to the sharedly developed programs and they are updated in the course of development.

13 Claims, 13 Drawing Sheets

FLOW CHART OF 15001

FIG. 5a

PREPARATION OF LOADING MESSAGE

FIG. 5b

DATA FIELD OF LOADING MESSAGE

FIG. 6a

| 601 — CONTENT CODE (CC) 6011 | INPUT PROGRAM (IPROG) 6012 | OUTPUT PROGRAM (OPROG) 6013 |
|---|---|---|
| 602 — ICC 1 | PROG 1 | |
| ⋮ | ⋮ | ⋮ |

SET I/O PROGRAM RELATION TABLE (652)

FIG. 10 ADDITION OF SUFFIX NUMBER OF TIMES OF PROGRAM MODIFICATION TO PROGRAMS A, B, C

FIG. 11 MODULE STRUCTURE

METHOD FOR MANAGING PROGRAMS WITH ATTRIBUTE INFORMATION AND DEVELOPING LOADED PROGRAMS

This application is a continuation of application Ser. No. 942,129 now abandoned, filed on Sep. 8, 1992, which is a continuation of application Ser. No. 283,911, filed on Dec. 13, 1988, now abandoned.

CROSS-REFERENCES TO RELATED APPLICATIONS

This application relates to the application U.S. Ser. No. 07/283,566, entitled "Method for Processing Data in A Distributed Processing System" filed by Toshihiko Sekizawa on Dec. 13, 1988, based on the Japanese patent application No. 62-318823 filed in Japan on Dec. 18, 1987, now U.S. Pat. No. 5,313,362.

BACKGROUND OF THE INVENTION

The present invention relates to a method for developing programs in a distributed processing system for sharing execution of a series of processes by a plurality of processors, in which a developing processor for developing the program develops application programs to be executed by the respective processors and the developed application programs are loaded to the respective processors.

The development of the programs in the distributed processing system is described in U.S. Pat. No. 4,627,055. JP-A 57-146361 discloses a distributed processing method for distributedly processing a series of tasks by processors connected to a common transmission line, in which programs for executing respective ones of the series of processes are distributedly stored in the respective processors, and the programs in the respective processors are started when data necessary to execute the programs have been loaded from the transmission line to the respective processors. This method enables distributed processing of the series of processes by the respective processors without requiring a control processor which controls an overall system.

JP-A 61-286959 discloses a method for broadcasting programs themselves which are to be executed by respective processors, over a transmission line as one of messages so that each processor takes in necessary ones of the programs broadcasted over the transmission line and stores it in its own processor.

In the past, programs are developed collectively. Accordingly, if one program is to be modified and adapted to develop a new version of the program, the new and old versions of the developed program can be identified by merely adding a serial number (generation number) which indicates the number of times of updating to the original program. Based on this number, it is possible to determine whether the developed program is to be further updated (modification or addition) or whether the developed program may be used in an executing computer.

However, this method does not pay attention to a case where programs are separately modified or added in separate developing systems based on one program in a distributed processing system having a plurality of developing systems.

In the conventional distributed processing system, since interfaces among the programs are defined only by I/O data of the programs, it is possible to individually develop respective programs. However, in the conventional method, there is no way to check whether there is consistency among the individually developed programs or between the programs and define information for the programs. This causes a problem in developing the programs.

In the conventional method, when the developed programs are to be loaded to the respective processors, it is necessary to define the I/O messages of the programs in order to identify the I/O data to the programs. If invalid or erroneous information is defined, the program would execute the process by a totally different message than the intended message.

SUMMARY OF THE INVENTION

It is an object of the present invention to provide a method for developing programs in a distributed processing system, which can check consistency among developed programs, and generate information necessary for loading the programs based on program attribute information so that efficiency in the development of programs is enhanced.

It is another object of the present invention to provide a method for developing programs in a distributed processing system for executing a series of processes by a plurality of processors, in which during the development of the programs to be loaded to the respective processors, a relationship between messages having I/O information and programs which input or output those messages is detected so that the status of preparing the programs may be indicated.

It is yet another object of the present invention to provide a method for developing programs in a distributed processing system in which a relationship among the programs is indicated and abnormality in the relationship among the programs is detected before the programs are loaded to the respective processors and started therein so that reliability of the programs is insured.

It is still yet another object of the present invention to provide a method for developing programs in a distributed processing system in which programs are developed not by a central control function but by a combination of a plurality of developing systems and a processor, and characteristic information by which each processor determines whether it can execute the program or not is added to the developed program based on a determination by each processor.

A further object of the present invention to provide a distributed processing system in which a plurality of program developing systems for developing programs in cooperation with each other (for example, the developing systems modify an original program parallelly or modify different portions sequentially) can readily recognize different generations of the programs, a relationship among the programs and features of the programs.

An even further object of the present invention is to provide a distributed processing system having a plurality of processors, which do not require a central control mechanism for centrally managing programs and enables cooperative development of the programs without being affected by the addition of a new processor in the system or maintenance work for the processor.

The above objects of the present invention are achieved by separating attribute information on I/O messages defined on a source program during compilation of the source program, storing it in a correspondence relation to a compiled load module, and preparing a table representing a relationship among the programs based on the attribute information.

The I/O information of the program is created for each program under development, and the I/O information of the respective programs are correlated so that the relationship among the programs under development is indicated and consistency thereof is checked. In loading the programs, a loading message consisting of a loading module of the program and the I/O information i s automatically generated.

In the development of programs in the distributed processing system, programs are broadcast over the transmission line without discriminating them from normal data. The program developing processors in the distributed processing system take in necessary programs based on codes indicating the contents of the programs and add characteristic information of the program and information on the process of updating so that the developed programs are managed by the decision of only the respective processors. The characteristic information of the program, that is, information for identifying partial programs, and program version information are added to the programs to be prepared or modified in the processors and they are broadcast over the common transmission medium. The respective developing processors, when they receive the information from the common transmission medium, modify the programs based on the characteristic information of the program and sends them to the transmission medium. Accordingly, the plurality of program developing systems can develop the programs in a cooperative manner.

DESCRIPTION OF THE PREFERRED EMBODIMENTS

Figure 2A:
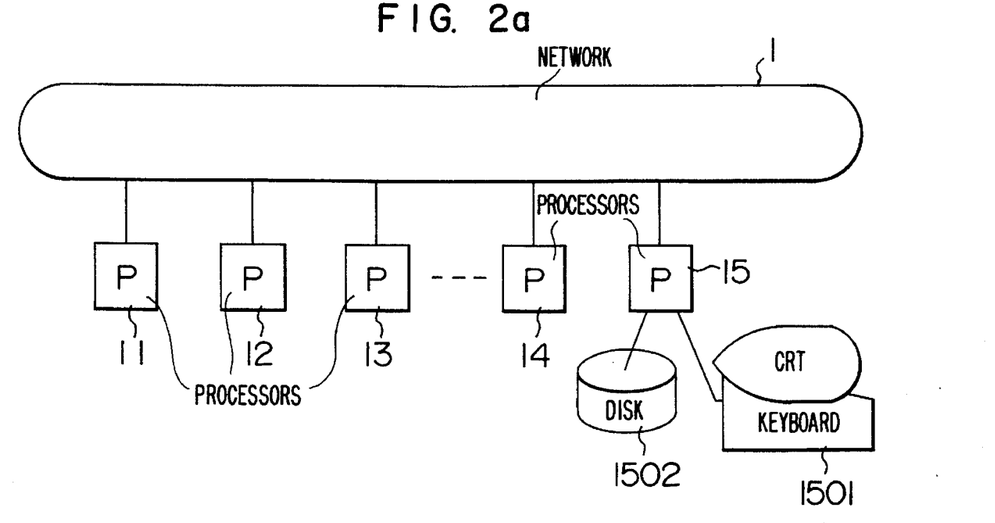
FIG. 2a, 2b, 2c shows a system in which programs developed by the present invention are to be loaded.
Figure 2B:
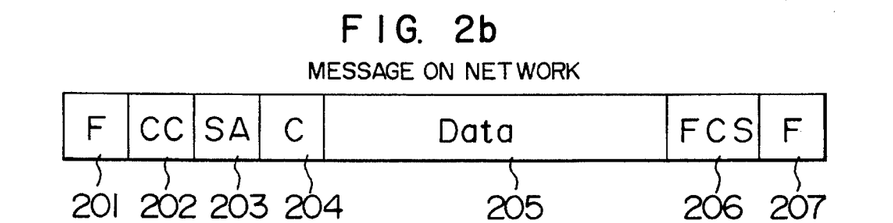
Figure 2C:
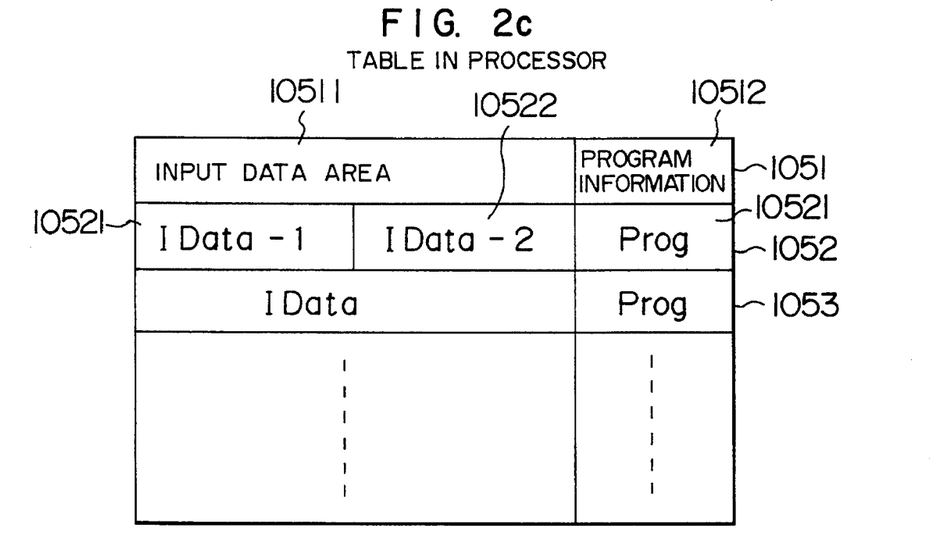

FIGS. 2a to 2c show a system to which the present invention is applied. FIG. 2a shows a configuration of an overall system. Numerals 11–14 denote processors which store application programs therein and execute them. Numeral 15 denotes a processor for developing the programs to be executed by the processors 11 to 14. A disk 1502 and a CRT terminal 1501 are connected thereto. Those units are hereinafter referred to as a developing system. The developed programs are executed by an executing system. The processors 11 to 15 are connected to a network 1, which may be of any form. The processed results (data) of the processors 11 to 14 are sent out to the network 1. Each processor takes in messages (including programs and data) necessary for the execution of programs in its own processor from the messages broadcasted over the network, and starts the program when all messages necessary for the execution have been taken in. The started program executes its own process and outputs a result.

FIG. 2b shows a format of the message broadcasted over the network 1. Each processor determines whether the message received from the network is necessary for its own program based on a content code (CC) 202 which indicates the data content. A source address (SA) 203 is an address of the processor which has issued a message, and C 204 is a serial number indicating the sequence of transmission. Data 205 shows a content of the result processed by the program, FCS 206 is an error check data for the transmission data, and F 201 and F 207 are flags indicating the beginning and end of the message.

FIG. 2c shows a table which each processor has for the determination of start of its own program. Lines 1051, 1052, . . . in the table of FIG. 2c correspond to the respective programs. In the first line, Prog 10512 is an area to store information of the program to be started, and IData 10511 is an area to store message necessary for the execution of the program Prog 10512 received from the network. The second line 1052 is designed such that the program is executed only when two messages IData-1 10521 and IData-2 10522 have . . . been stored. The third and subsequent lines are of similar structure. The content code of the message necessary for the execution has been previously stored in IData 10511 of the table for each program. Each processor compares the CC 202 of the message received from the network with the content code of the table in its own processor, and stores the message in the matching IData area 10511. When all necessary messages have been stored in the IData area 10511, the processor utilizes the data in the messages to execute the program in the Prog area 10512. When all necessary messages have been stored in the IData-1 and IData-2 areas, the Prog area 10521 is executed.

The program development system for the program to be executed by the above system is now explained in detail with reference to FIGS. 1, 3, 4a, 4b, 5a, 5b, 6a, 6b, 6c, 7a and 7b.

Figure 1:
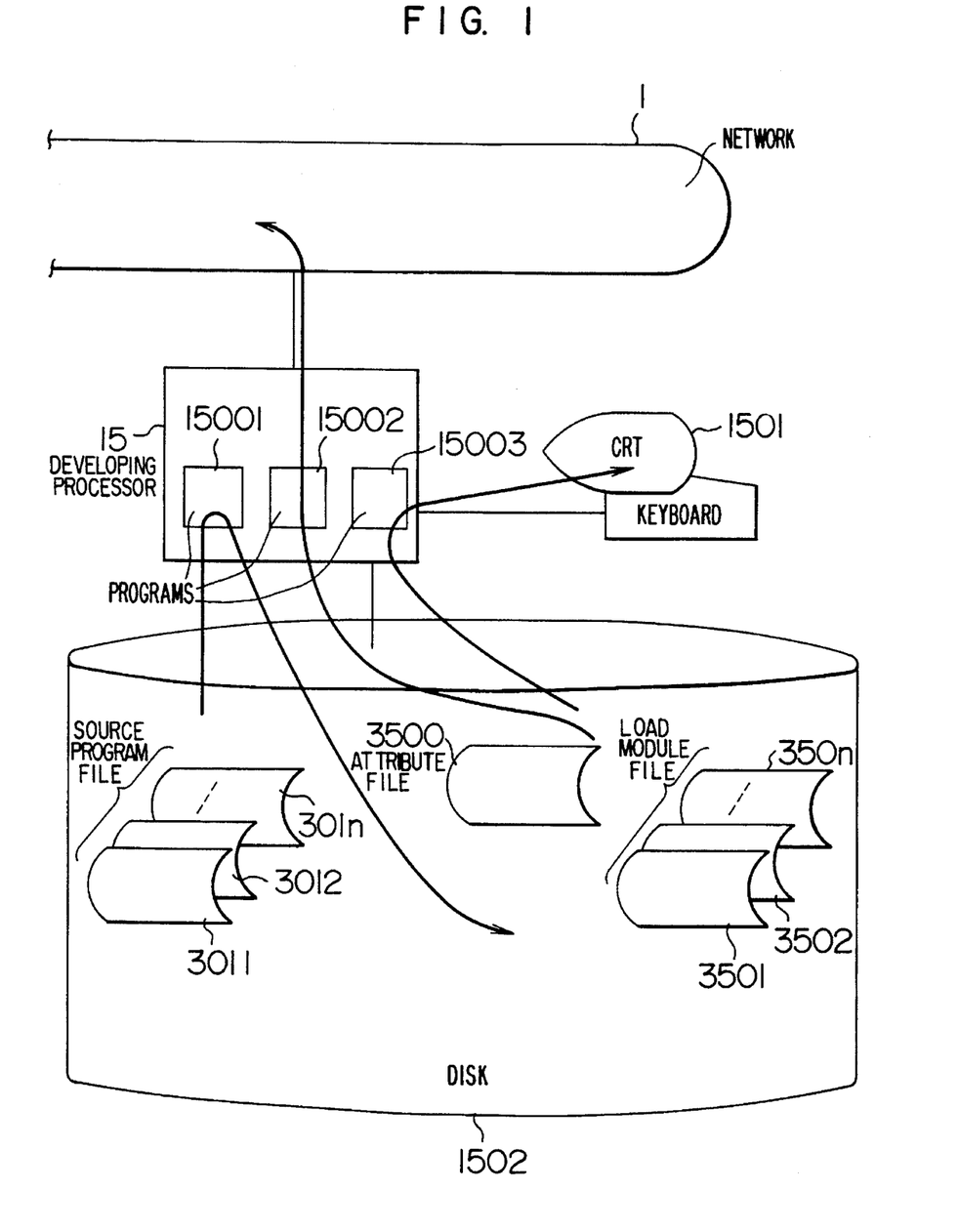
FIG. 1 shows an example of program to be loaded to a developing processor for realizing a program development method of the present invention.

FIG. 1 shows a program for handling a message in the developing processor 15. Programs 15001, 15002 and 15003 are loaded in the processor 15. Those programs are started in response to inputs from the display (CRT) terminal 1501. The program 15001 is an attribute generation program which generates load module files 3501–350n and an attribute file 3500 for designated one of source program files 3011, 3012, . . . . The program 15002 is a broadcast program which prepares a loading message by combining the load module file and the attribute file and broadcasts it over the network 1. The program 15003 is a consistency check program which correlates programs based on the content of the attribute file 3500. The contents of processes of those programs are explained below. The process of the program 15001 is first explained with reference to FIGS. 3 and 4.

Figure 3:
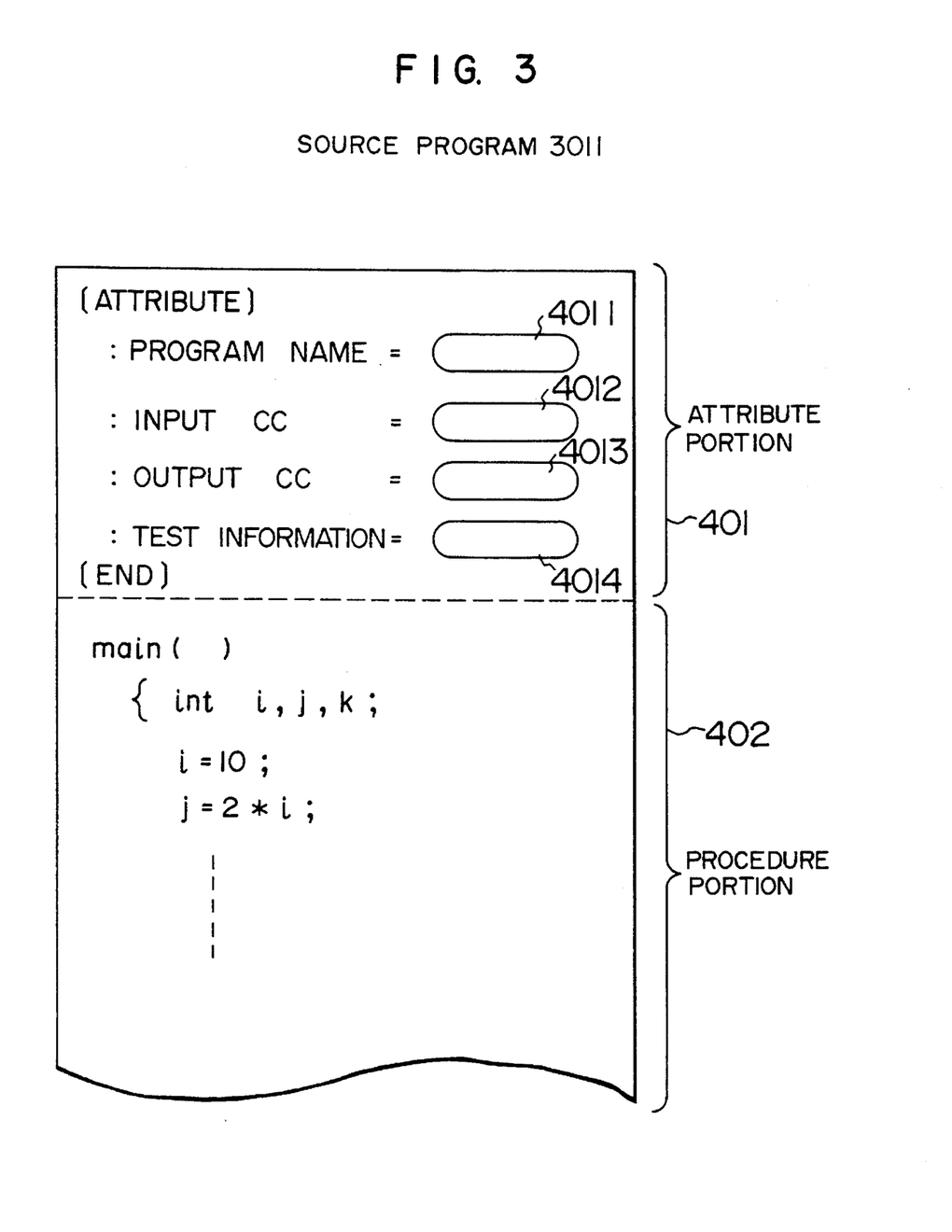
FIG. 3 shows an example of format of a source program which is a subject of the program development method of the present invention.
Figure 4A:
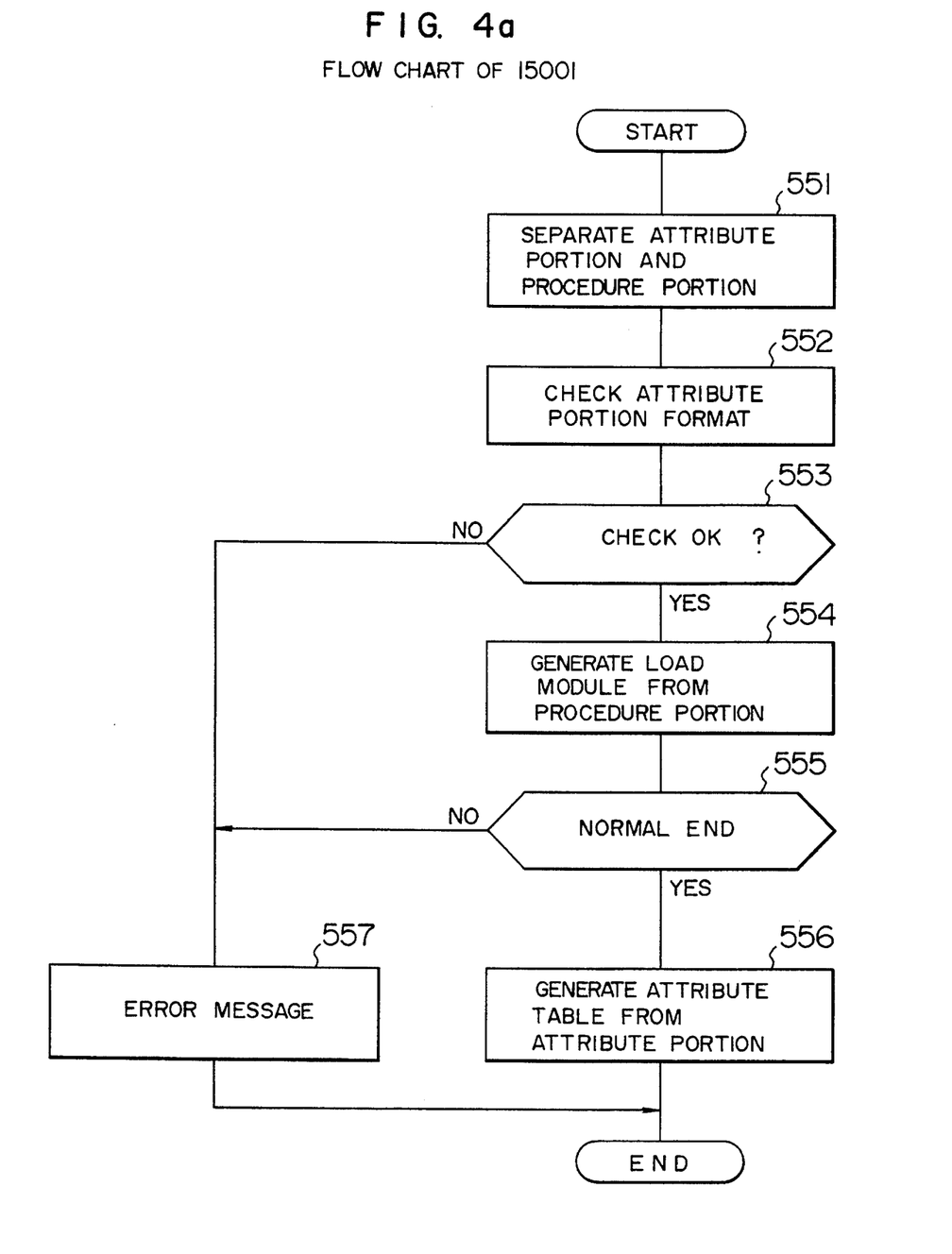
FIGS. 4a–4b, 5a–5b, 6a–6b and 7a–7b show the present method.

FIG. 3 shows contents of source programs 3011–301n of FIG. 1. Those source programs have been previously entered by a program developer from the CRT terminal 1501. The source program which is subject of the present method consists of an attribute portion 401 and a procedure portion 402. The attribute portion 401 comprises a program name define field. 4011, an input message content code define field 4012, an output message content code define field 4013, and information for testing the program (for example, test input and result thereof) 4014. The procedure portion 402 includes coded program.

Figure 4B:
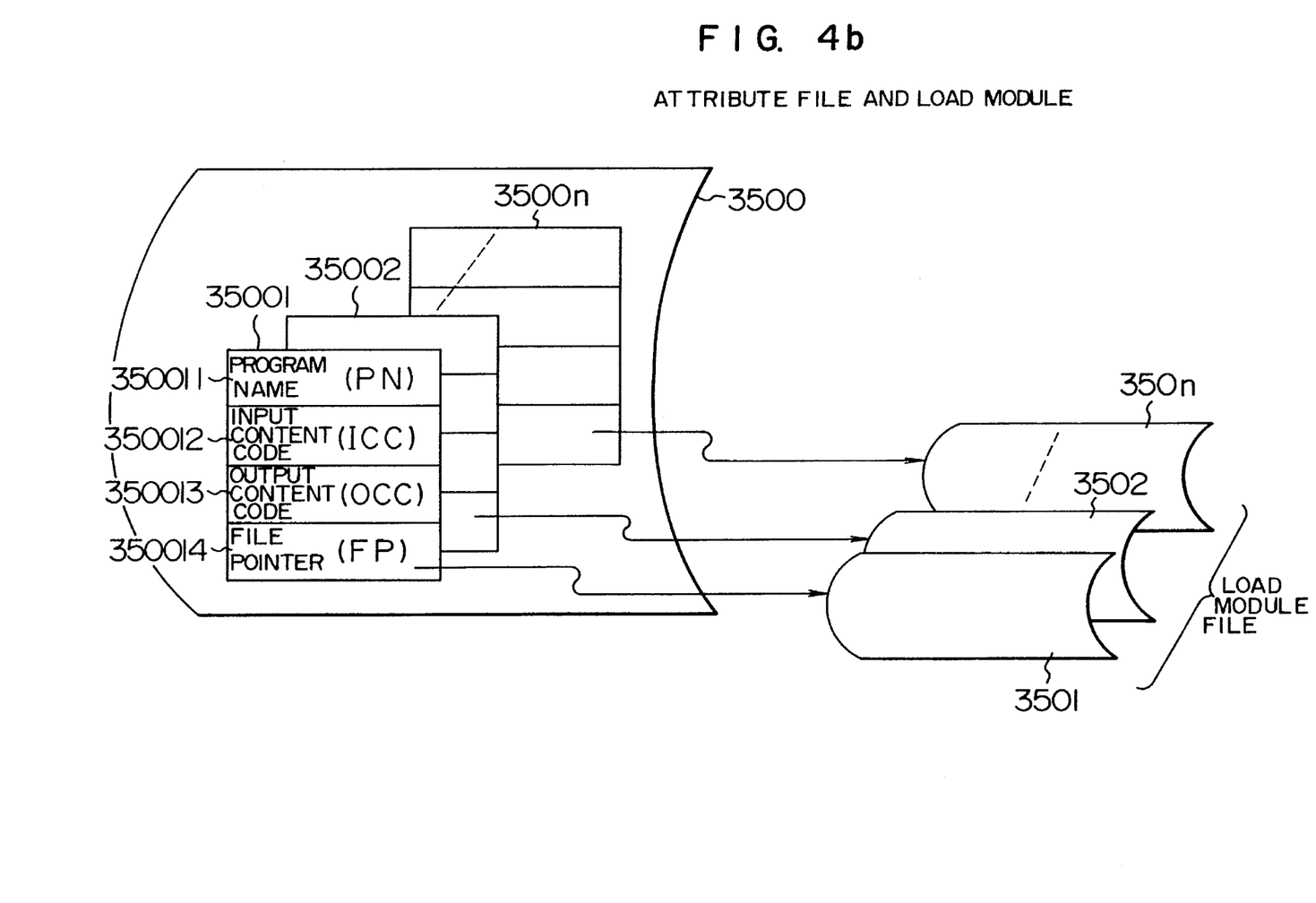

FIG. 4a shows a process flow of the program 15001. The compile program 15001 starts its process when a source program file to be converted to a load module is designated by the terminal 1501. The attribute generation program 15001 divides the designated source program into an attribute portion and a procedure portion (step 551). A format of the separated attribute portion is checked (step 552). In the format check, whether the content of the attribute portion is equal to 401 of FIG. 3 is checked. If the result of the format check is OK, the process proceeds to a step 554, and if it is not OK, an error message is produced (step 557) and the process is terminated. In the step 554, the procedure portion separated in the step 551 is compiled to generate a load module file. If the compiling is terminated normally, the process proceeds to a step 556, and if it is terminated in error, an error message is produced (step 557) and the process is terminated. In the step 556, right sides of the items of the attribute portions 401 which passed the format check are collected to prepare an attribute file (3500 in FIG. 1) (step 556). Structures of the attribute file and the load module file thus prepared are shown in FIG. 4b. The attribute file 3500 contains attribute tables 35001, 35002, . . . which have one-to-one correspondence to the load module files 3501, 3502, . . . prepared in the step 554. The table 35001 comprises an area PN 350011 which contains a program name 4011 defined in the source program attribute portion. 401 of FIG. 3, an area ICC 350012 which contains an input message content code 4012 defined in the attribute portion 401, an area OCC 350013 which contains an output message content code 4013, and a file pointer FP 350014 pointing a load module file prepared from a source program having attributes of the areas PN, ICC and OCC. The tables 35002, 35003, . . . are of the same structure. The load module files 3501, 3502, . . . are always accessed through the attribute tables 35001, 35002, . . . . Namely, the load module files are accessed by the program names. Accordingly, when a load module file is to be deleted, the corresponding attribute table should also be deleted. In the step 556 of FIG. 4a, if there already is an attribute table having the same program name PN, the existing attribute table and the corresponding load module file are deleted and an attribute table is prepared.

Figure 5A:
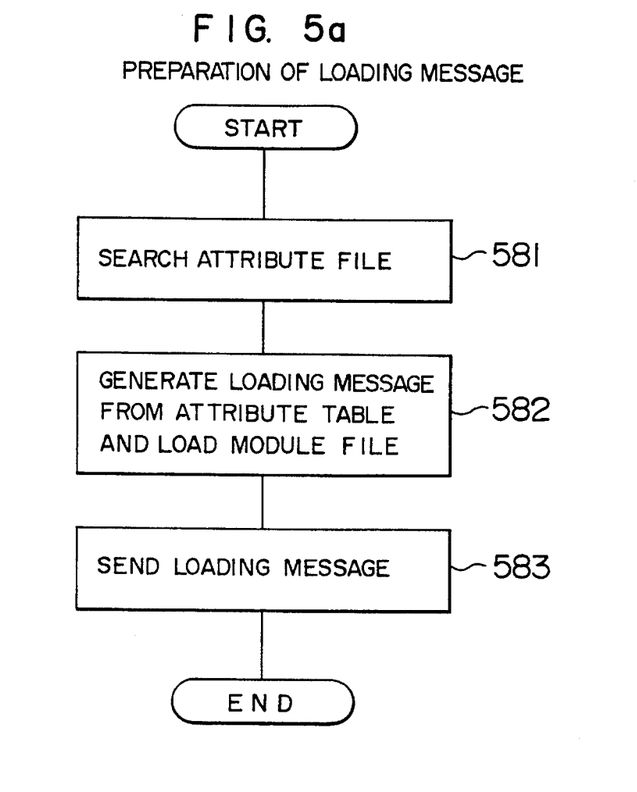
Figure 5B:
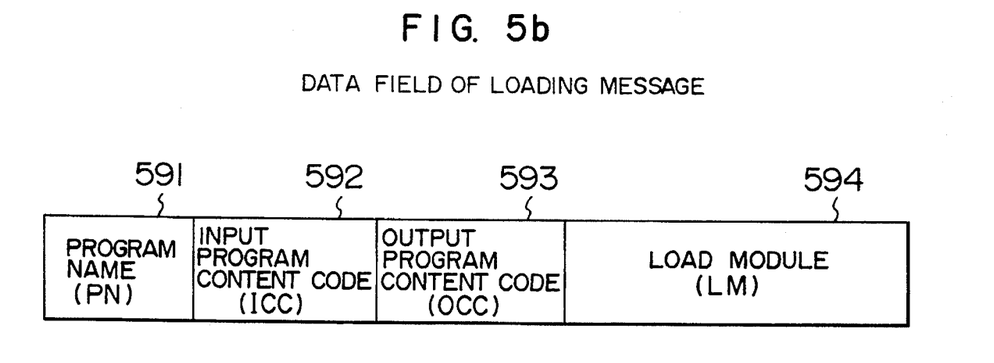

The loading program 15002 of FIG. 1 for generating a message to be loaded to a processor is explained with reference to FIG. 5. This program is executed when the program name of the program to be loaded from the CRT terminal (1501 in FIG. 2) through the network 1 is designated. An attribute table having the PN field (FIG. 4b) which is identical to the designated program name is searched from the attribute file (step 581). Then, the retrieved attribute table and the corresponding load module are combined to prepare the message to be loaded (step 582). A content of the data field (205 in FIG. 2b) of the message to be loaded prepared in the step 582 is shown in FIG. 5b. PN 591 stores the program name PN of the attribute table, and ICC 592 and OCC 593 store the input content code ICC and the output content code OCC of the attribute table, respectively. LM 594 stores the content of the load module file. The CC field (202 in FIG. 2b) of the message to be loaded stores the content code corresponding to the program when the preparation of the messages shown in FIG. 5b and 2b has been completed, the broadcast program 15002 broadcasts the messages over the network (step 583). The message prepared by the process of FIG. 5 and sent over the network is received by the processors connected to the network. The processor determines whether the program in the message is necessary for its own processor based on the CC field in the message, and if it is necessary, takes the received message into its own processor. When the processor has taken in the message, it stores the content of LM of the data field of the message into the memory area of the processor and register the program loaded to the program registration table shown in FIG. 2c based on the contents of PN, ICC and OCC of the data field of the message (see FIG. 5b). Then, the loaded program is started for test by using test information in the attribute information, that is, the test input data to determine whether the output data processed by the program has a predetermined relation with the input data. If the test result is OK, the program is rendered on-line. In the above process, it is assumed that the content code indicating the program required by the processor has been registered in that processor.

Figure 6A:
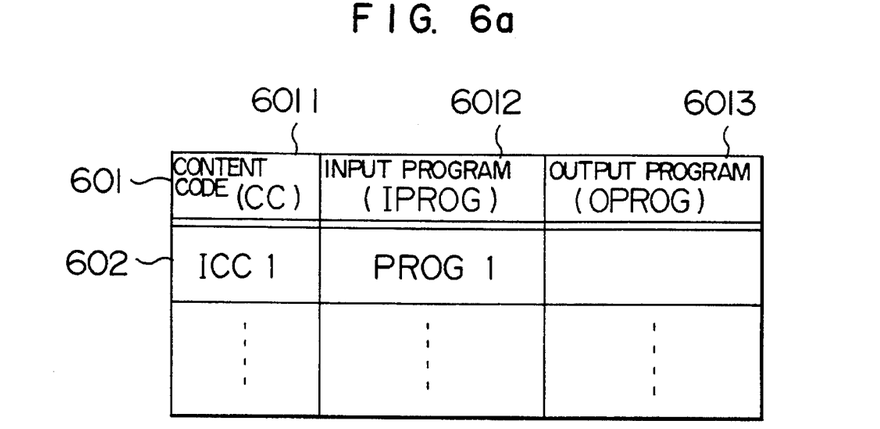

The process of the consistency checking program 15003 (FIG. 1) which correlates the programs based on the content of the attribute file is explained with reference to FIGS. 6 and 7. FIG. 6a shows a table showing a relation between I/O programs prepared by the programs 15003. The I/O relation program consists of lines 601, 602, . . . corresponding to the respective content codes. The first line 601 comprises an area CC 6011 for storing the content code, an area IPROG 6012 for storing the name of program which inputs the message having the content code of the area CC 6011, and an area OPROG 6013 for storing the name of program which outputs the message having the content code of the area CC 6011. The second line and subsequent lines are of the same structure.

Figure 6B:
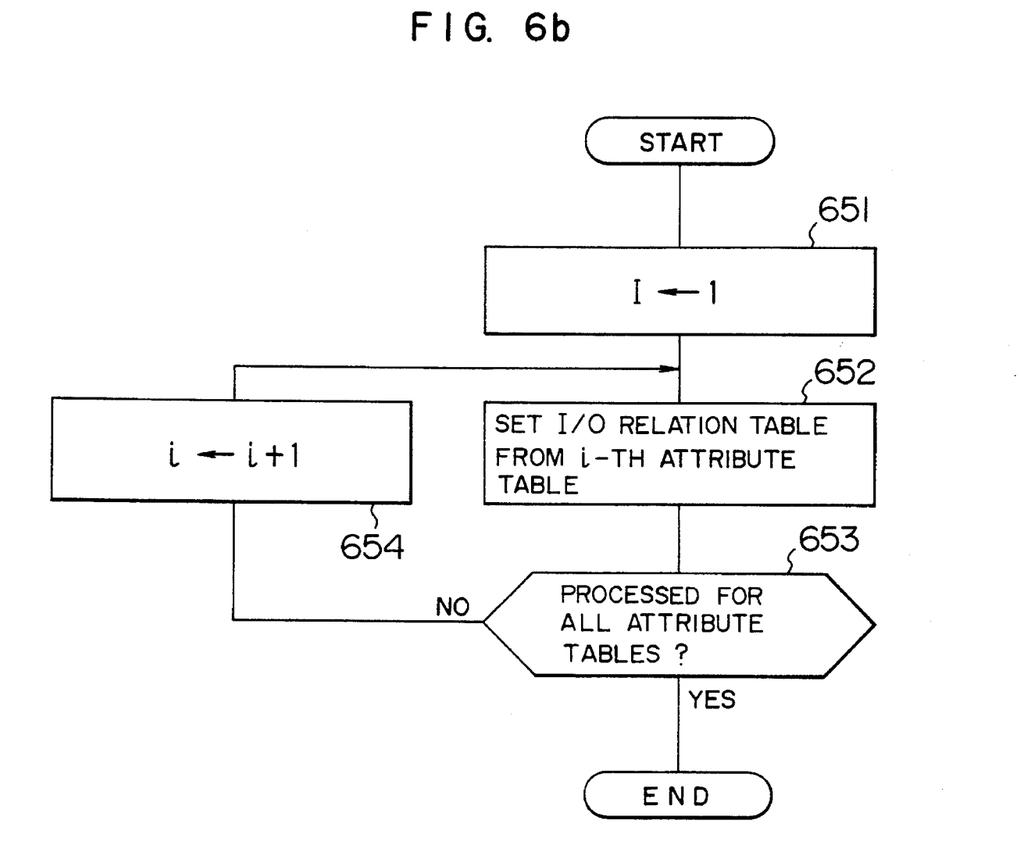
Figure 6C:
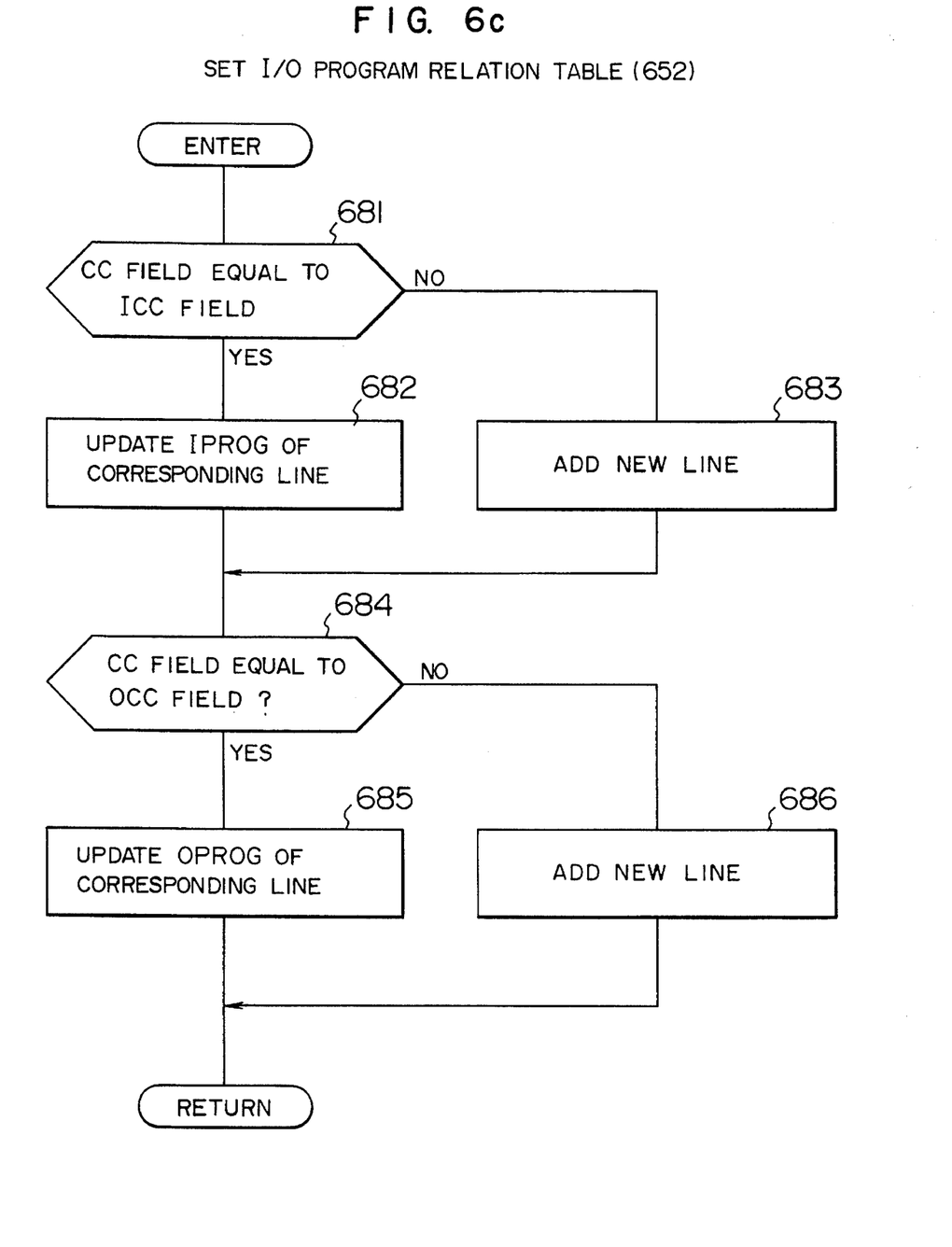
Figure 7A:
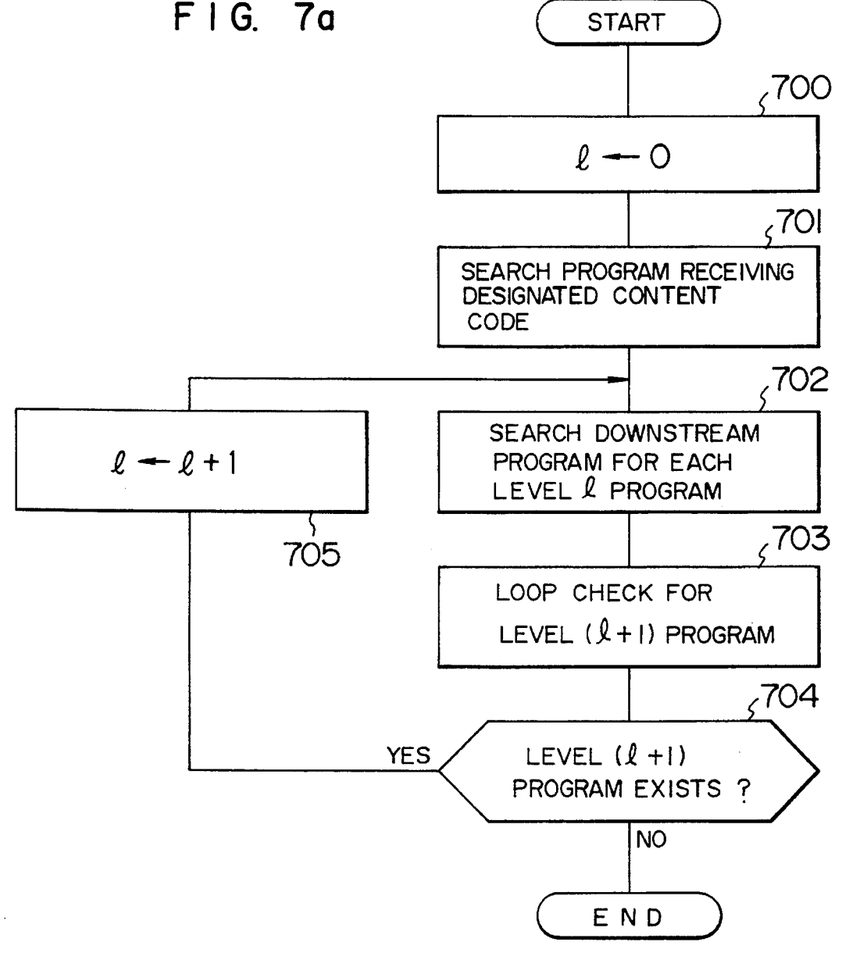
Figure 7B:
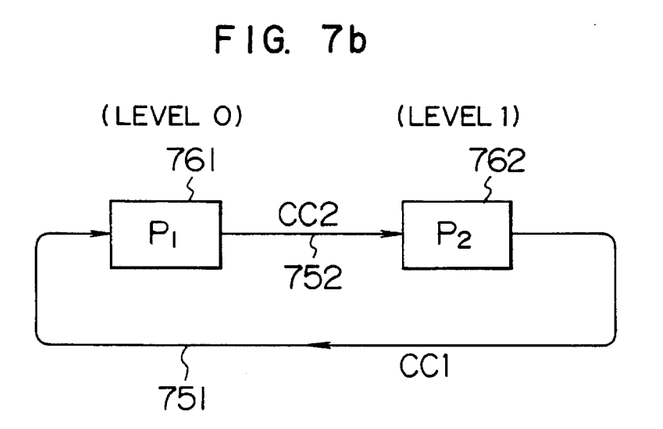

FIG. 6b shows a process flow for preparing the I/O relation table shown in FIG. 6a. A counter variable i is first initialized (step 651). Based on the content of the i-th attribute table (FIG. 4b), the I/O relation table is set in accordance with a flow chart shown in FIG. 6c (step 652). A line which has the content code equal to the content code set in the ICC field of the attribute table, in the CC field is searched from the I/O relation table (step 681). If the corresponding line exists, the content of the PN field of the attribute table is set in the area IPROG 6012 of that line (step 682). If the corresponding line does not exist, a new line is added to the I/O relation table, and the contents of the ICC field and the PN field of the attribute table are set to the CC field and the IPROG field of that line, respectively (step 683). Then, a line which contains the content code equal to the content code contained in the OCC field of the attribute table is searched from the I/O relation table (step 684). If there is the corresponding line, the content of the PN field of tile attribute table is set into the output program (OPROG) area of that line (step 685). If there is no corresponding line, the program name of FIG. 4 is set into a new line of the I/O relation table, and the contents of the OCC field and the PN field of the attribute table are set into the CC field and the OPROG field of that raw, respectively (step 686). After the process of FIG. 6c, whether all attribute tables in the attribute file have been so processed or not is checked (step 653), and if they have not been processed, the counter variable i is incremented by one (step 654) and the process returns to the step 652.

Based on the I/O relation table thus prepared, a program which is started by a message having any content code and a program which outputs the message having that content code can be grasped. By searching a line having the IPROG area or the OPROG area of the table not set, the program which includes no program to output the input message, and the program which include no program to take in the output message can be detected. This, is an example of error detection in the program relation. By this I/O relation table, a series of programs which are started for any message can be detected. A process therefor is explained with reference to FIGS. 7a and 7b. The process is started by designating a content code of a message which will function as a trigger. An internal counter l is set to "0" (step 700). A program which receives the message having the content code designated by an operator through a terminal 1501 is searched from the I/O relation table, and it is defined as a level l program (step 701). For each level l program searched, the program which receives the output message thereof is searched, and it is defined as a level (l+1) program (step 702). This is attained by detecting the content code of the output message from the attribute table for the program and searching the program which receives the message having the code from the I/O relation table. Whether a program equal to the level (l+1) program searched in the step 702 exists in the programs so far searched (levels 0–l programs) is checked, and if it exists, the level (l+1) program is not permitted for loop check (step 703). This is a process to detect an abnormal structure as shown in FIG. 7b, in which numerals 761 and 762 denote programs, numeral 751 denotes a message having a content code CC1, and numeral 752 denotes a message having a content code CC2. In this structure, a process flow of starting the program 761 by the output message of the program 762 is looped, and there is a possibility of abnormal relation between the programs. Accordingly, a step 703 is also an example of detection of the abnormal relation between the programs. In a step 704, whether the level (l+1) program exists or not is checked, and if it does not exist, the process is terminated. If it exists, the internal variable l is incremented by one and the process returns to the step 702. In the step 704, the program which is not permitted for the loop check is handled as if there were no level (l+1) program.

In this manner, by merely defining the information relating to the I/O message on a source program, it is possible to automatically generate the information for loading the program to the executing processor. It is also possible to grasp the relation between programs and detect an abnormal relation between programs.

In the present embodiment, the attribute table of the program is generated together with the load module thereof. Alternatively, only the attribute table may be generated without generating the load module. The relation between programs may be checked even when only the attribute field in the source program is defined. In the present embodiment, the attribute table is stored in other file than the load module. Alternatively, the load module and the corresponding attribute table may be stored in one file and handled as a unit.

In the present embodiment, a system comprising a plurality of processors is used, although the present method is equally applicable to a system comprising a single processor (in which a developing processor and an execution processor are not separated).

In the present embodiment, the processor which has the program loaded therein tests the program based on the test information in the program attribute information. In the developing processor, it is possible to automatically test the developed program based on the program attribute information.

Figure 8:
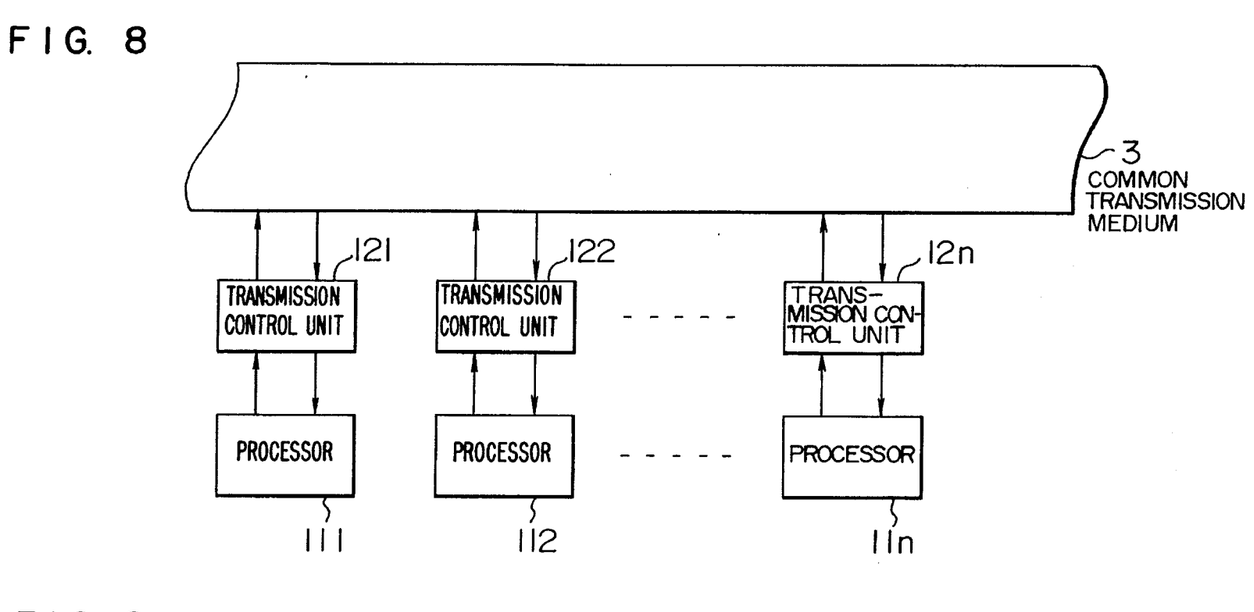
FIG. 8 shows a block diagram of a distributed processing system in accordance with the present method.

FIG. 8 shows a block diagram of a distributed processing system for implementing the present method. In the present distributed processing system, n processors 111, 112, . . . , 11n communicate with each other through a common transmission medium 3 by transmission control units 121, 123, . . . , 12n connected to the processors. Each processor can modify and generate programs.

Figure 9:
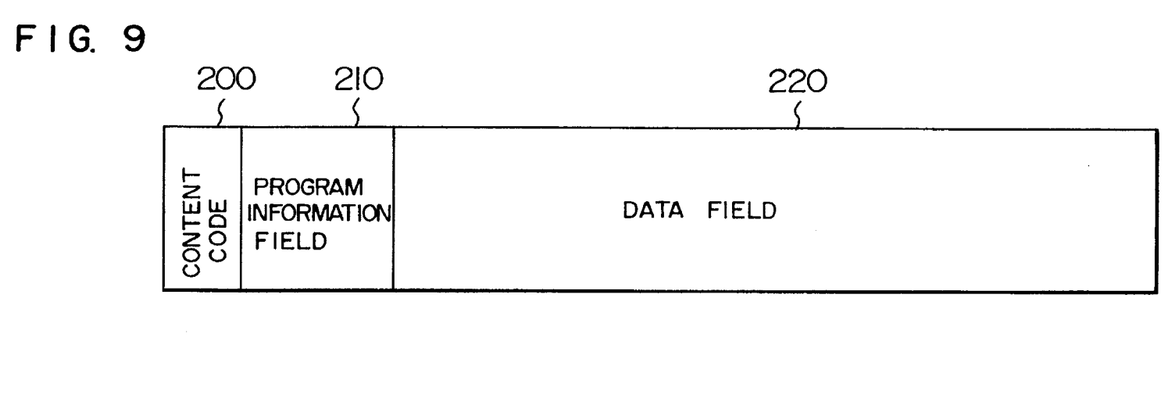
FIG. 9 shows an example of message format of information to be transmitted and received through a transmission medium.

FIG. 9 shows a transmission format of information transmitted over the common transmission medium. In the distributed processing system, the information transmitted over the transmission medium is received by the transmission control units, which read the content code 200 of the information and determine whether it is required by the processors. If it is required, the information is transmitted to the connected processor. When the information having that content code has been completely received in the program stored in the processor, it is read and processed as the input data of the program to be executed. (It is assumed that the content code has been stored in the memory of the transmission control unit.) In the present example, the process is distributed in a data flow fashion in accordance with the content code. In the embodiment of the present method, the information may be exchanged between the processors by a communication protocol which designates a destination without using the content code.

A program generated by at least one of the processors of the distributed processing system and broadcasted over the common transmission medium is written into the data field 220 of FIG. 9. The following information relating to the program written into the data field is written into the program information field 210. The program information includes (i) program content information, (ii) program generation information, and (iii) program characteristic information.

The program content information represents function and content of the program. For example, it describes an I/O relation of the program. In the program of the present embodiment which processes in the data flow fashion by using the content code, the I/O relation may include the content code of the information necessary for the process and the content code of the information to be outputted after the process.

Figure 10:
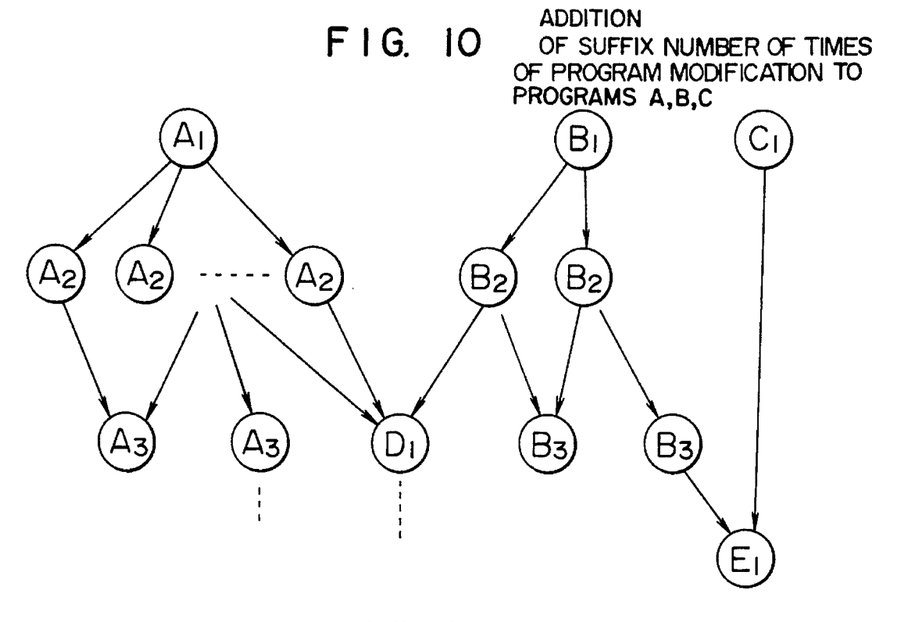
FIGS. 10 to 12 show examples of modification of program.
Figure 11:
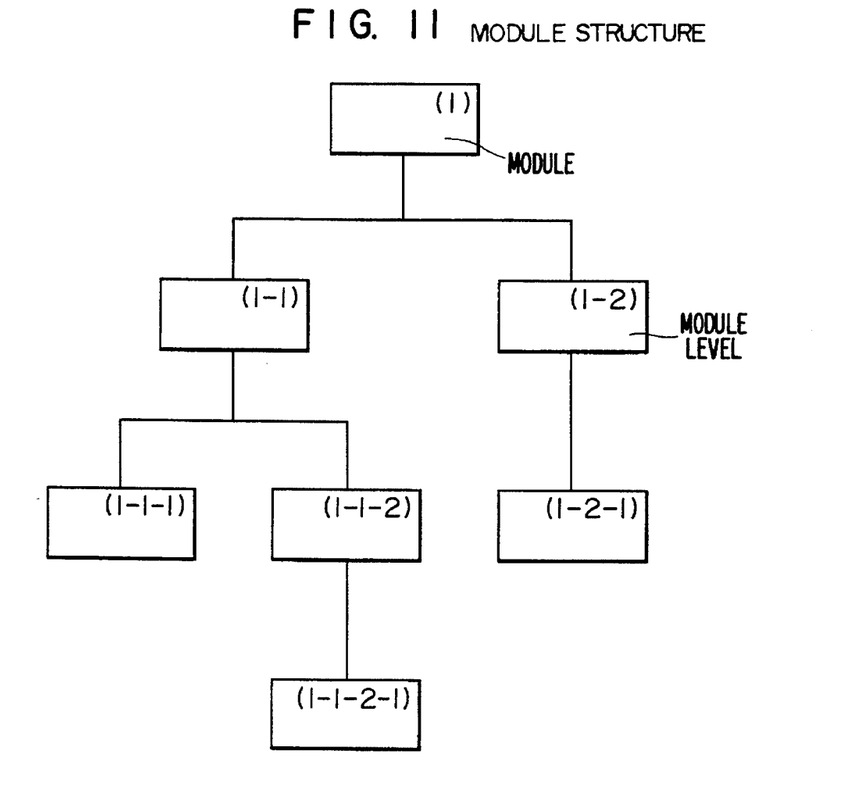
Figure 12:
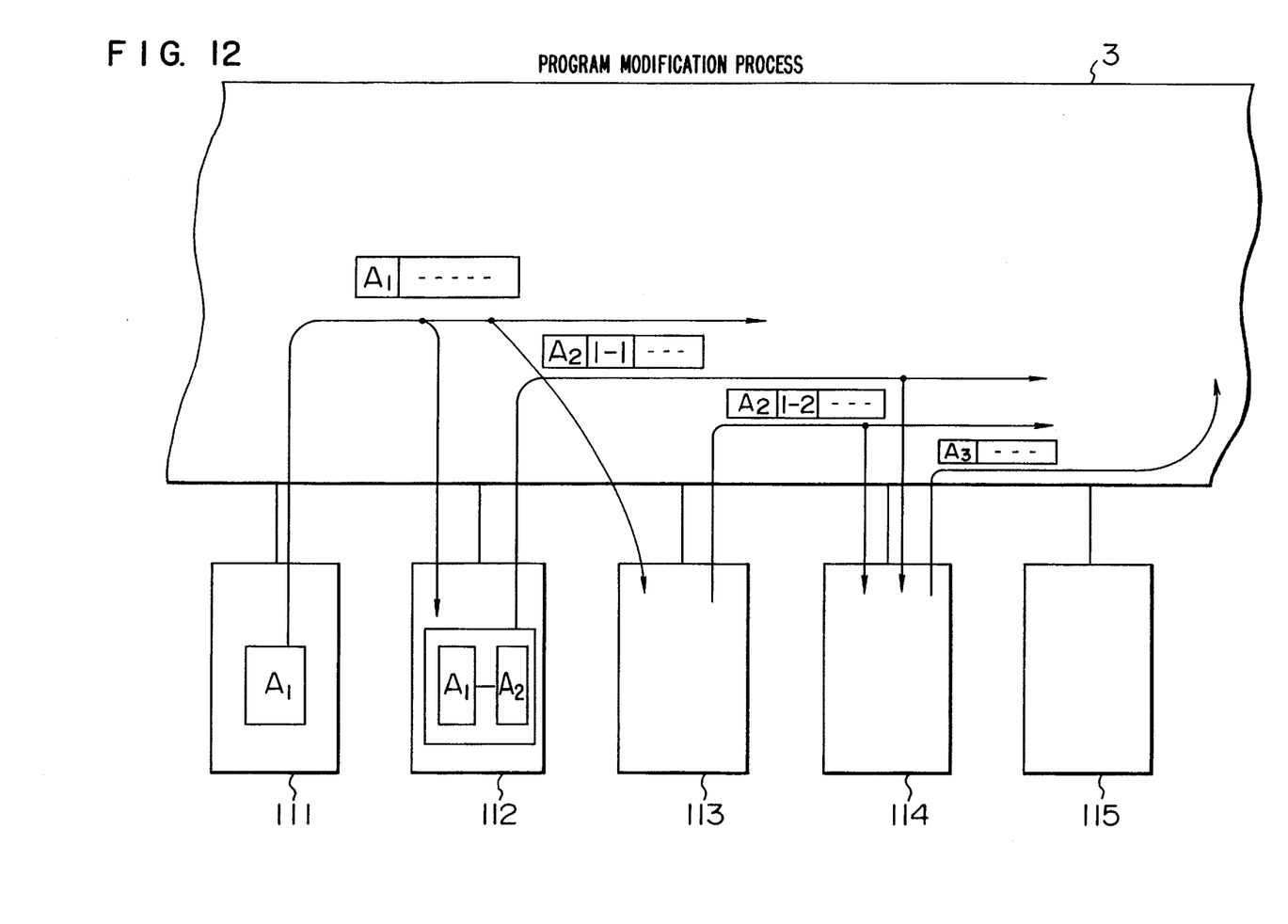

The program generation information represents the modifications applied to one program by the plurality of processors. In the distributed processing system considered in the present embodiment, one program flows through the processors through the common transmission medium and each processor adds, deletes or replaces the programs. The program generation information is used to discriminate the source program before modification from the source program after modification. This information may be described by adding all modification processes so that the program development structure in the distributed processing system may be recognized. Alternatively, as shown in FIG. 10, the number of times of modification of the original program may be counted each time the processor makes the amendment. In this method, as shown in FIG. 10, if the plurality of processors individually modify a program $A_1$, a plurality of program $A_2$ (where suffix 2 indicates a version of program generation and modification) exist in the distributed processing system. This may be used where the modification works in the respective processors in the development process of the program have been predetermined and one source program is to be built up by collecting the programs of the same version. The program generation information may include the information relating to the version or number of times of modification as well as information relating to the modification area. The modification area information may designate the modification area by one statement level of the program, or a source module level of the modified area may be described by considering only a source program module structure in one source program, as shown in FIG. 11. This method is sufficient where the program is developed for each module level. In FIG. 12, the program $A_1$ is modified by the processors. (Transmission control units are not shown). $A_1, A_2, A_3, \ldots$ indicate the numbers of times of modification, and 1-1 and 1-2 indicate the modification areas (module levels).

The program characteristic information relates to a characteristic of a program in the execution of the program, and it includes ① execution time, ② program size and ③ memory capacity. This information is added in the processor in which the program has been modified and it is used when the program is executed.

The (i) program content information, (ii) program generation information and (iii) program characteristic information explained above correspond to an external specification of program. In the present invention, the external specification is added to the program and they are broadcasted over the common transmission medium so that further development of program and the execution of the program in the processor may be done at the decision of its own processor without requiring any central control function.

The program information field 210 of FIG. 9 contains all or a portion of the information (i) to (iii).

Figure 13:
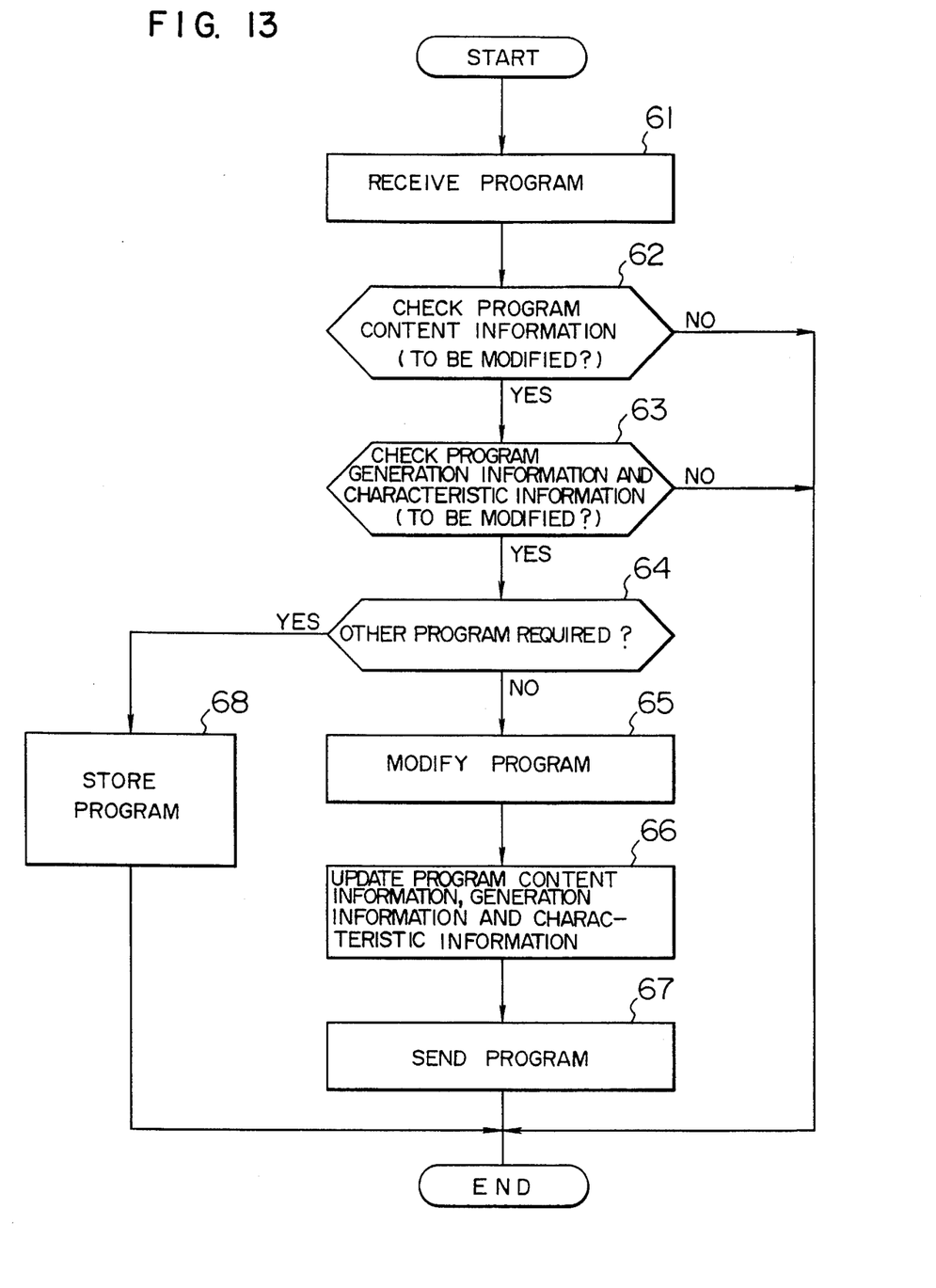
FIG. 13 shows a flow chart of a process in a processor in accordance with the present method.

FIG. 13 shows a process flow in the processor in accordance with the present method.

As shown in FIG. 13, each processor receives the source program sent over the common transmission medium (step 61), checks the program content information, program generation information and characteristic information included in the program to determine whether the program is to be modified or not (steps 62 and 63).

If it is to be modified and no other program is required (step 64), the program is modified (step 65) and new program content information, generation information and characteristic information are added to the program (step 66), and they are transmitted through the common transmission medium (step 67). If other program is required, that program is stored (step 68).

We claim:

1. A method for developing programs by at least one processor in a distributed processing system for sharing execution of a series of steps of programs in a plurality of processors interconnected by a transmission line, said method comprising the steps, executed by a computer, of:

(a) inputting a source program including attribute information which includes information representing content of input data and content of output data of said source program in a processor, said attribute information being information required by any one of said processors to execute and test said source program;

(b) generating an executable program module in response to said source program;

(c) transmitting said generated executable program module along with said attribute information over said transmission line, by said processor; and (d) loading said transmitted executable program module together with said attribute information for execution in any one of the other processors.

2. A method for developing programs according to claim 1, further comprising the step, executed by a computer of:

checking relation of input and output data of programs in said one of the other processors based on said attribute information transmitted with said executable program module.

3. A method for developing programs according to claim 1 wherein each processor loads a message including said transmitted executable program module, required by said processor, based on said attribute information transmitted with said executable program module included in said message.

4. A method for developing programs according to claim 1 further comprising the step, executed by a computer, of:

preparing a table for correlating the programs based on said attribute information.

5. A method for developing programs according to claim 1 wherein said attribute information includes information for testing said executable program module.

6. A method for developing programs according to claim 1 further comprising the steps, executed by a computer, of:

wherein said attribute information includes program generation information, program content information and program modification information added thereto, over said transmission line;

modifying said executable program module based on said attribute information transmitted with said executable program module in said one of the other processors, and updating the content of said attribute information in accordance with the modification; and retransmitting the modified executable program module over the transmission line.

7. A method for developing a program in a distributed processing system for sharing processing of a series of steps of one job of a plurality of processors connected to a common transmission medium, said distributed processing system including means for sending information from said processors to said common transmission medium, means for receiving information necessary to execute a program stored in each of the processors, from said common transmission medium, and means for detecting the reception of all information necessary for execution, for executing the program by using the information as input information, and for sending execution result information to said common transmission medium, said method comprising the steps, executed by a computer, of:

receiving a source program including attribute information including information representing contents of input and output data of said source program in a processor, said attribute information being information required by any one of said processors generating, based on said source program, an executable program along with program generation information representing the number of modifications of said source program, program content information representing content of said source program and program modification information representing content of the modifications of said source program and transmitting said executable program along with said information over said common transmission medium; and modifying said executable program in each of the processors based on said information transmitted along with said executable program, updating said program generation information, program content information and program modification information, and retransmitting said executable program along with said updated information over said common transmission medium.

8. A method for developing programs by at least one processor in a distributed processing system for sharing execution of a series of steps of programs in a plurality of processors interconnected by a transmission line, said method comprising the steps, executed by a computer, of:

(a) adding to a source program describing steps, attribute information including information representing content of input data and content of output data of said source program in a processor and test information for use in testing said source program, said attribute information being information required by said processor to execute and test said program;

(b) generating an executable program module in said processor based on said source program;

(c) testing a relation between said executable program module and other programs in said processor based on the information representing content of input data and content of output data of said source program to detect an abnormal relation;

(d) transmitting said executable program module together with said attribute information over said transmission line, by said processor;

(e) loading said transmitted executable program module together with said attribute information in any one of the other processors; and testing a relation between said loaded executable program module and other programs in the one of the other processor to detect an abnormal relation; and (f) executing said loaded executable program module based on said attribute information.

9. A method for developing programs according to claim 8, wherein said testing step comprises the step, executed by a computer, of:

checking relation of input and output data of said loaded executable program module and said other programs based on said attribute information of said programs.

10. A processor for developing programs in a distributed processing system having a plurality of processors interconnected by a transmission line for sharing execution of a series of steps of programs, comprising:

a compiler for inputting a source program including attribute information which includes information representing content of input data and content of output data of said source program, said attribute information being information required to execute and test said source program and generating an executable program module in response to said source program;

means for transmitting said generated executable program module along with said attribute information over said transmission line; and means for loading an executable program module together with said attribute information from said transmission line for execution.

11. A processor for developing programs according to claim 10, wherein said attribute information includes program generation information, program content information and program modification information added thereto, over said transmission line; and wherein said processor further comprises:

means for modifying said executable program module based on said attribute information transmitted with said executable program module, updating the content of said attribute information in accordance with the modification and retransmitting the modified executable program over the transmission line.

12. A processor for developing a program in a distributed processing system having a plurality of processors connected to a common transmission medium for sharing processing of a series of steps of one job, comprising:

means for sending information from said processor to said common transmission medium;

means for receiving information necessary to execute a program stored in said processor from said common transmission medium;

means for detecting the reception of all information necessary for execution of a program executing the program by using the information as input information, and sending execution result information to said common transmission medium;

a compiler for receiving a source program including attribute information which includes information representing contents of input and output data of said source program, said attribute information being information required by said processor, generating, based on said source program, an executable program along with program generation information representing the number of modifications of said source program, program content information representing content of said source program and program modification information representing content of the modifications of said source program, and transmitting said executable program along with said information over said common transmission medium; and means for modifying an executable program from said common transmission medium based on information transmitted along with said executable program, updating program generation information, program content information and program modification information included in said information and retransmitting said executable program along with said updated information over said common transmission medium.

13. A processor for developing programs in a distributed processing system having a plurality of processors interconnected by a transmission line for sharing execution of a series of steps of programs, comprising:

a compiler for adding to a source program attribute information including information representing content of input data and content of output data of said source program and test information for use in testing said source program, said attribute information being information required by said processor to execute and test said source program and generating an executable program module based on said source program;

means for transmitting said executable program module together with said attribute information over said transmission line;

means for loading an executable program module together with said attribute information from said transmission line;

means for testing a relation between said loaded executable program module and other programs stored in said processor to detect an abnormal relation; and means for executing said loaded executable program module if an abnormal relation is not detected based on said attribute information.

* * * * *